United States Patent
Wideman et al.

(10) Patent No.: US 6,534,584 B2
(45) Date of Patent: Mar. 18, 2003

(54) SILICA REINFORCED RUBBER COMPOSITION WHICH CONTAINS CARBON BLACK SUPPORTED THIOGLYCEROL COUPLING AGENT AND ARTICLE OF MANUFACTURE, INCLUDING A TIRE, HAVING AT LEAST ONE COMPONENT COMPRISED OF SUCH RUBBER COMPOSITION

(75) Inventors: Lawson Gibson Wideman, Hudson, OH (US); Kevin James Pyle, Uniontown, OH (US); Richard Robinson Smith, Cuyahoga Falls, OH (US); Paul Harry Sandstrom, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 97 days.

(21) Appl. No.: 09/756,538

(22) Filed: Jan. 8, 2001

(65) Prior Publication Data

US 2002/0128369 A1 Sep. 12, 2002

(51) Int. Cl.$^7$ .................................................. C08K 3/34
(52) U.S. Cl. ................. 524/493; 524/492; 524/495; 524/496; 524/261; 524/424; 525/349
(58) Field of Search ................ 524/496, 495, 524/261, 424, 492, 493; 525/349

(56) References Cited

U.S. PATENT DOCUMENTS

| | | | |
|---|---|---|---|
| 4,720,534 A | * 1/1988 | Singer et al. | 528/28 |
| 4,818,804 A | 4/1989 | Kuriyama et al. | 526/211 |
| 5,094,829 A | 3/1992 | Krivak et al. | 423/339 |
| 5,541,243 A | * 7/1996 | Ohmura et al. | 524/128 |
| 5,679,728 A | 10/1997 | Kawazura et al. | 523/215 |
| 5,708,069 A | 1/1998 | Burns et al. | 524/403 |
| 5,750,610 A | 5/1998 | Burns et al. | 524/434 |
| 5,789,514 A | 8/1998 | Burns et al. | 528/12 |
| 5,900,467 A | * 5/1999 | Wideman et al. | 525/349 |
| 6,028,137 A | * 2/2000 | Mahmud et al. | 523/215 |
| 6,156,822 A | * 12/2000 | Materne et al. | 152/151 |

FOREIGN PATENT DOCUMENTS

| | | | |
|---|---|---|---|
| EP | 0791622 | 8/1997 | C08K/5/372 |
| EP | 0896604 | 11/1997 | C08J/3/20 |
| EP | 0849321 | 6/1998 | C08L/9/00 |

OTHER PUBLICATIONS

European Search Report.

* cited by examiner

Primary Examiner—David W. Wu
Assistant Examiner—Henry S. Hu
(74) Attorney, Agent, or Firm—Henry C. Young, Jr.

(57) ABSTRACT

This invention relates to a conjugated diene-based rubber composition reinforced with silica-based reinforcement together with a composite of carbon black supported non-silane coupling agent as 1-thioglycerol(3-mercapto-1,2-propanediol) and exclusive of 2,2'-benzothiazyl disulfide. The invention includes an article of manufacture, including a tire, having at least one component comprised of such rubber composition.

17 Claims, No Drawings

SILICA REINFORCED RUBBER COMPOSITION WHICH CONTAINS CARBON BLACK SUPPORTED THIOGLYCEROL COUPLING AGENT AND ARTICLE OF MANUFACTURE, INCLUDING A TIRE, HAVING AT LEAST ONE COMPONENT COMPRISED OF SUCH RUBBER COMPOSITION

FIELD OF THE INVENTION

This invention relates to a conjugated diene-based rubber composition reinforced with silica-based reinforcement together with a composite of carbon black supported non-silane coupling agent as 1-thioglycerol(3-mercapto-1,2-propanediol) and exclusive of 2,2'-benzothiazyl disulfide. The invention includes an article of manufacture, including a tire, having at least one component comprised of such rubber composition.

BACKGROUND FOR THE INVENTION

For various applications utilizing rubber compositions, carbon black and/or synthetic amorphous silica-based materials are conventionally used as particulate reinforcing fillers for the elastomer(s) of the rubber composition(s).

Often a coupling agent is used together with the silica in order to couple, or otherwise enhance, its elastomer reinforcement effect for the elastomer(s) and such use of a coupling agent is well known to those having skill in such art.

Historically, such coupling agents may be, for example, silane-based compounds which have one moiety (a silane-based moiety such as, for example, an alkoxysilane moiety) which is reactive with hydroxyl groups (e.g. silanol groups) on the surface of a synthetic amorphous silica and having another moiety (e.g. a polysulfide bridge) which becomes interactive with a conjugated diene-based elastomer.

For example, bis-(3-trialkoxysilylpropyl) polysulfides having an average of from 2 to 4 connecting sulfur atoms in their polysulfidic bridge are often used as a coupling agent (or adhesive) to enhance coupling of synthetic amorphous silicas, such as aggregates of precipitated silica, to various conjugated diene-based elastomers. Use of such coupling agents is well known to those having skill in such art.

However, use of silane-containing coupling agents, or adhesives, which rely upon a reaction between the silane and hydroxyl groups (e.g. silanol groups) on the surface of a synthetic amorphous silica typically releases an alcohol as a by-product of such reaction. For example, a reaction of a bis-(3-triethoxysilylpropyl) tetrasulfide coupling agent with silanol groups on the surface of a silica material releases ethanol as a by-product.

For various purposes, it may be desired to reduce or substantially eliminate, or even entirely eliminate such alcohol evolution created by an in situ reaction of said reactants, with an associated alcohol formation, within an elastomer host during the mixing of a rubber composition which contains such reactants.

It has heretofore been suggested to utilize, as a combination of materials for use as a non-silane coupling agent, a combination of 1-thioglycerol(3-mercapto-1,2-propanediol) and 2,2'-benzothiazyl disulfide including such combination where at least one of said materials is provided as being deposited on carbon black.

In the description of this invention, the term "phr" is used to designate parts by weight of a material per 100 parts by weight of elastomer. In the further description, the terms "rubber" and "elastomer" may be used interchangeably unless otherwise mentioned. The terms "vulcanized" and "cured" may be used interchangeably, as well as "unvulcanized" or "uncured", unless otherwise indicated.

SUMMARY AND PRACTICE OF THE INVENTION

In accordance with one aspect of this invention, a rubber composition is provided which comprises (A) 100 parts by weight of at least one diene hydrocarbon based elastomer, (B) about 25 to about 100, optionally about 35 to about 90, phr of particulate reinforcing filler comprised of about zero to about 100, alternately about 10 to about 70, phr of synthetic amorphous silica aggregates and, correspondingly, from zero to about 75, alternately about 5 to about 60, phr of at least one of carbon black and silica treated carbon black having domains of silica on its surface, wherein said silica aggregates and said silica domains on the surface of said treated carbon black contain hydroxyl groups (e.g. silanol groups) on their surface; and (C) about 0.5 to about 10, preferably about 1 to about 7, phr of a coupling agent as 1-thioglycerol(3-mercapto-1,2-propanediol), exclusive of 2,2'-benzothiazyl disulfide, provided as a composite of carbon black and said 1-thioglycerol(3-mercapto-1,2-propanediol), in a weight ratio of said thioglycerol material to carbon black in a range of from about 1:10 to about 1:1;

wherein said coupling agent composite is mixed with said elastomer(s), according to one or more of the following:

(1) mixing said 1-thioglycerol(3-mercapto-1,2-propanediol)/carbon black composite and said particulate reinforcement in an internal rubber mixer;

(2) mixing said 1-thioglycerol(3-mercapto-1,2-propanediol)/carbon black composite with said elastomer(s) and said particulate reinforcement in an internal rubber mixer, wherein said particulate reinforcement includes at least one of said synthetic precipitated silica aggregates and said silica treated carbon black which has been pre-hydrophobated prior to mixing with said elastomers with an alkylsilane of the general formula (II):

$$X_n\text{—Si—}R_{4-n} \qquad (II)$$

wherein X is a radical selected from alkoxy radicals having from 1 through 3 carbon atoms, preferably selected from methoxy and ethoxy radicals, and from halogen radicals selected from at least one of chlorine and bromine radicals, preferably a chlorine radical; R is an alkyl radical having from 1 to 18 carbon atoms, preferably from 1 through 4 carbon atoms and more preferably selected from methyl and ethyl groups; and n is an integer of 1 through 3, (3) mixing said 1-thioglycerol(3-mercapto-1,2-propanediol)/carbon black composite with said elastomer(s) and an alkylsilane of the said formula (II) with said elastomer(s) and particulate reinforcement in an internal rubber mixer, and In further accordance with this invention, an article of manufacture is provided which contains at least one component comprised of the rubber composition of this invention.

In additional accordance with this invention, a tire is provided which contains at least one component comprised of the rubber composition of this invention.

In further accordance with this invention, a tire is provided having a tread comprised of the rubber composition of this invention.

Accordingly, the synthetic amorphous silica may be selected from aggregates of precipitated silica, which is intended to include precipitated aluminosilicates as a co-precipitated silica and aluminum, and from fumed (pyrogenically formed) silica, whereas the silica is preferably a precipitated silica.

Such precipitated silica is, in general, well known to those having skill in such art. For example, such precipitated silica may be precipitated by controlled addition of an acid such as, for example, hydrochloric acid or sulfuric acid, to a basic solution (e.g. sodium hydroxide) of a silicate, for example, sodium silicate, usually in the presence of an electrolyte, for example, sodium sulfate. Primary, colloidal silica particles typically form during such process which quickly coalesce to form aggregates of such primary particles and which are then recovered as precipitates by filtering, washing the resulting filter cake with water or an aqueous solution, and drying the recovered precipitated silica. Such method of preparing precipitated silica, and variations thereof, are well known to those having skill in such art.

The carbon black with domains of exposed silica on its surface may be, for example, carbon black prepared by treatment of carbon black by reaction of an alkyl silane (e.g. an alkoxy silane) with carbon black or by co-fuming carbon black and silica at an elevated temperature. For example, see U.S. Pat. Nos. 5,679,728 and 6,028,137.

In practice, as hereinbefore discussed, the said 1-thioglycerol(3-mercapto-1,2-propanediol)/carbon black composite, exclusive of 2,2'-benzothiazyl disulfide, is provided as being supported on a carbon black carrier, as a composite of said thioglycerol and carbon black, in order to promote an improved dispersion of the material thioglycerol coupling agent in the rubber composition. The thioglycerol may be provided as being supported on a carbon black carrier by a process such as, for example, by dissolving the thioglycerol in a volatile organic solvent such as, for example acetone, and adding the solvent solution to the particulate carbon black, then removing the solvent.

It is considered herein to be significant that, in the practice of this invention, a silica coupler can be used to assist precipitated silica in the reinforcement of diene hydrocarbon elastomers without (A) a silane based compound (e.g. an alkoxysilane compound), and particularly (B) in the absence of an organo polysulfide compound (e.g. a bis-(3-triethoxysilylpropyl) disulfide or tetrasulfide or a similar alcohol evolving silane coupler. This is considered herein to be significant because the use of non-ethanol evolving silica couplers help keep the environment free of organic pollutants.

While the mechanism may not be clearly understood, it is envisioned that the adjacent hydroxyl groups of the 1-thioglycerol(3-mercapto-1,2-propanediol) react with hydroxyl groups (e.g. silanol groups) contained on the surface of the silica and the mercapto group of the 1-thioglycerol(3-mercapto-1,2-propanediol) interacts with the diene-based elastomer(s) of the rubber composition.

Accordingly, it is envisioned herein that the 1-thioglycerol(3-mercapto-1,2-propanediol) of the carbon black composite interacts in situ within the elastomer host to form a silica coupler by forming a carbon-to-sulfur bond. Thereby a coupling agent is formed with a moiety (the 1-thioglycerolhydroxyl groups) reactive with hydroxyl groups on the surface of the silica, or silica-containing carbon black and another moiety (the mercapto group) which is reactive with at least one of said diene-based elastomers.

Accordingly, hereinbefore discussed, the 1-thioglycerol (3-mercapto-1,2-propanediol) of the said carbon black composite and silica material, particularly precipitated silica and/or or silica-containing carbon black, may be individually mixed with a diene-based elastomer in an internal rubber mixer to a temperature in a range of from about 125° C. to about 190° C. wherein the said 1-thioglycerol(3-mercapto-1,2-propanediol) diol moiety is allowed to react with hydroxyl groups contained on the surface of said silica material in situ within the elastomer host.

It is preferred that such in situ reaction within the elastomer host is accomplished without an appreciable, and preferably in the absence of, evolution of an alcohol. Indeed, by the inherent chemistry of a conventional reaction of said diol moiety of 1-thioglycerol(3-mercapto-1,2-propanediol) with hydroxyl groups contained on the surface of said silica material, water a by-product of the reaction is evolved instead of an alcohol.

In one aspect of the invention, the precipitated silica is provided as a pre-hydrophobated silica which is hydrophobated prior to its addition to the elastomer (pre-hydrophobated). Thus, the 1-thioglycerol(3-mercapto-1,2-propanediol) of the carbon black composite is reacted with the pre-hydrophobated silica material in situ within the elastomer host. In particular, is it considered herein that pre-hydrophobation of the silica material, particularly with an alkyl silane or alkoxy silane, enables a more efficient mixing, or processing, of it within the elastomer host in that such pre-hydrophobation of the silica material (1) renders it more compatible with the diene-based elastomer and (2) substantially reduces a tendency for a precipitated silica to re-agglomerate with itself within the elastomer host. Moreover, the accompanying in situ reaction of the diol moiety of 1-thioglycerol(3-mercapto-1,2-propanediol) of the carbon black composite enables both a more efficient mixing coupled with the associated reaction with only a minimal evolution of an alcohol, preferably no evolution of alcohol from the rubber composition.

While this invention is not intended to be directed to a specific preparation technique (preparation of silica hydrosols, recovery of silica gels and precipitated silicas, etc.) of the pre-hydrophobated precipitated silica itself, for education purposes in this regard, reference might be made to the *Encyclopedia of Chemical Technology*, Fourth Edition (1997), Volume 21, Kirk-Othmer in Pages 1020 through 1026 and U.S. Pat. No. 5,094,829 as well as U.S. Pat. Nos. 5,708,069, 5,789,514 and 5,750,610 for a more detailed discussion.

Representative alkylsilanes of Formula (I) are, for example, trichloro methyl silane, dichloro dimethyl silane, chloro trimethyl silane, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

In practice, various diene-based elastomers may be used such as, for example, homopolymers and copolymers of monomers selected from isoprene and 1,3-butadiene and copolymers of at least one diene selected from isoprene and 1,3-butadiene and a vinyl aromatic compound selected from styrene and alphamethyl styrene, preferably styrene.

Representative of such conjugated diene-based elastomers are, for example, cis 1,4-polyisoprene (natural and synthetic), cis 1,4-polybutadiene, styrene/butadiene copolymers (aqueous emulsion polymerization prepared and organic solvent solution polymerization prepared), medium vinyl polybutadiene having a vinyl 1,2-content in a range of about 15 to about 90 percent, isoprene/butadiene copolymers, styrene/isoprene/butadiene terpolymers. Tin coupled elastomers may also be used, such as, for example, tin coupled organic solution polymerization prepared styrene/butadiene co-polymers, isoprene/butadiene copolymers, styrene/isoprene copolymers, polybutadiene and styrene/isoprene/butadiene terpolymers.

In the further practice of this invention, particulate reinforcement for the rubber composition may be particulate synthetic amorphous silica, or a combination of carbon black and amorphous silica (exclusive of silica treated carbon black), usually of an amount in a range of about 25 to about 100 alternately about 35 to about 90, phr. If a combination of such carbon black and silica is used, usually at least about 5 phr of carbon black and at least 10 phr of silica are used. For example, a weight ratio of silica to carbon black ranging from about 1/5 to 5/1 might be used.

Commonly employed synthetic amorphous silica, or siliceous pigments, used in rubber compounding applications can be used as the silica in this invention, including precipitated siliceous pigments and fumed (pyrogenic) silica wherein aggregates of precipitated silicas are usually preferred.

The precipitated silica aggregates preferably employed in this invention are precipitated silicas such as, for example, those obtained by the acidification of a soluble silicate, e.g., sodium silicate and may include co-precipitated silica and a minor amount of aluminum.

Such silicas might usually be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica may also be typically characterized by having a dibutylphthalate (DBP) absorption value in a range of about 50 to about 400 $cm^3/100$ g, and more usually about 100 to about 300 $cm^3/100$ g.

Various commercially available precipitated silicas may be considered for use in this invention such as, only for example herein, and without limitation, silicas from PPG Industries under the Hi-Sil trademark with designations Hi-Sil 210, Hi-Sil 243, etc; silicas from Rhodia as, for example, Zeosil 1165MP and Zeosil 165GR, silicas from Degussa AG with, for example, designations VN2 and VN3, as well as other grades of silica, particularly precipitated silicas, which can be used for elastomer reinforcement.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 1 to about 10 phr. Typical amounts of waxes comprise about 1 to about 5 phr. Often microcrystalline waxes are used. Typical amounts of peptizers comprise about 0.1 to about 1 phr.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above additives are not considered to be an aspect of the present invention, unless otherwise indicated herein, which is more primarily directed to the utilization a non-silane containing coupling agent for enhancing reinforcement of a conjugated diene-based elastomer with a particulate synthetic amorphous silica material which contains hydroxyl groups (e.g. silanol groups) on its surface.

The mixing of the rubber composition can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, and fillers such as silica and silica treated carbon black and adhesive agent, are mixed in one or more non-productive mix stages. The terms "non-productive" and "productive" mix stages are well known to those having skill in the rubber mixing art.

The following examples are presented to illustrate the invention and are not intended to be limiting. The parts and percentages are by weight unless otherwise designated.

EXAMPLE I

A one liter, open-top, glass reactor was charged with 25 grams (g) of N330 carbon black suspended by stirring in 50 milliliters (ml) of acetone solvent. To the suspension is then added 25 g of 1-thioglycerol (3-mercapto-1,2-propanediol), with continued stirring at about 25° C. for about 30 minutes. The acetone solvent was removed under reduced pressure with stirring to yield 50.8 g of particles as a composite of carbon black and 1-thioglycerol (3-mercapto-1,2-propanediol) in a weight ratio of about 50/50 and thereby composed of about 50 percent by weight of the carbon black and about 50 percent by weight the 1-thioglycerol (3-mercapto-1,2-propanediol).

EXAMPLE II

Rubber compositions comprised of natural rubber and solution SBR with carbon black and silica as reinforcements were prepared as shown in Table 1 and are identified herein as Samples A–C. The first non-productive mixing step was conducted for about 4 minutes to a temperature of about 160° C. the final productive mixing step was conducted for about 2 minutes to a final temperature of about 110° C.

Sample A is a Control Sample in which no silica coupler was added.

Sample B is a Control Sample in which an ethoxysilane/polysulfide coupling agent is added during the second non-productive mixing step.

Sample C represents a practice of this invention in which a non-silane coupling agent as the carbon black composite of Example I herein is added during the second non-productive mixing step.

The elements of Control Samples A and B and Sample C are shown in the following Table 1.

TABLE 1

| Material | Control Sample A | Control Sample B | Sample C |
|---|---|---|---|
| Non-productive Mixing Step 1 | | | |
| Natural rubber[1] | 50 | 50 | 50 |
| Styrene/butadiene rubber[2] | 50 | 50 | 50 |
| Carbon black[3] | 43 | 43 | 43 |
| Processing oil[4] | 5.8 | 5.8 | 5.8 |
| Antioxidant/antiozonant[5] | 3.3 | 3.3 | 3.3 |
| Stearic acid | 2 | 2 | 2 |
| Zinc oxide | 2.5 | 2.5 | 2.5 |
| Non-productive Mixing Step 2 | | | |
| Silica[6] | 17 | 17 | 17 |
| Processing oil[4] | 3 | 3 | 3 |
| Non-silane coupler (50% active)[7] | 0 | 0 | 4 |
| Silane coupler (50% active)[9] | 0 | 3.5 | 0 |

TABLE 1-continued

| Material | Control Sample A | Control Sample B | Sample C |
|---|---|---|---|
| Productive Mixing Step | | | |
| Sulfur | 1.3 | 1.3 | 1.3 |
| Accelerator(s)[8] | 1.1 | 1.1 | 1.1 |

[1]Natural rubber
[2]Styrene/butadiene rubber obtained as SLF 1216 from The Goodyear Tire & Rubber Company
[3]ASTM N299
[4]Naphthenic/parafinic rubber processing oil
[5]P-phenylenediamine type
[6]Obtained as Hi-Sil ® 210 from PPG Industries
[7]Product of Example 1, said 1-thioglycerol, exclusive of any polysulfide material, deposited on carbon black on a 50/50 weight basis
[8]Sulfenamide type
[9]Composite of bis (3-ethoxysilylpropyl) tetrasulfide and carbon black on a 50/50 weight basis as Si-69 on carbon black from Degussa Various physical properties of the Samples of Table 1 were evaluated and reported in the following Table 2.

TABLE 2

| | Parts | | |
|---|---|---|---|
| Properties | Sample A Control | Sample B Control | Sample C |
| Modulus/Tensile/Elongation | | | |
| 100%, MPa | 1.7 | 2.1 | 2.2 |
| 300%, MPa | 9 | 12.3 | 11.6 |
| Ult tensile strength (MPa) | 17.1 | 19 | 18.8 |
| Ult elongation (%) | 475 | 439 | 457 |
| Hardness (Shore A) | | | |
| 23° C. | 61 | 64 | 66 |
| 100° C. | 52 | 56 | 58 |
| Rebound. % | | | |
| 23° C. | 48 | 49 | 47 |
| 100° C. | 61 | 64 | 61 |
| Tear Resistance, N | 80 | 76 | 73 |
| DIN Abrasion (cm³ loss) | 120 | 105 | 102 |
| Dynamic Stiffness 0° C. | | | |
| E' | 18.3 | 20.3 | 23.1 |
| Tan delta 60° C. | 0.170 | 0.175 | 0.159 |
| E' | 6.9 | 8.8 | 10 |
| Tan delta | 0.092 | 0.091 | 0.096 |

The results, shown in Table 2, clearly show the importance of adding a coupling agent to Control Sample A, whether it is a conventional alkoxysilane/polysulfide or the non-silane/carbon black coupling agent without a polysulfide component used in this invention.

As compared to Control Sample A which does not contain a coupling agent, Sample C in which the non-silane, non polysulfide coupling agent/carbon black composite, which is the subject of this invention, shows improvement in several of the measured properties, namely increased 100 percent and 300 percent modulus, tensile strength, hardness, E' stiffness with greatly reduced DIN abrasion which leads to improved treadwear while maintaining tire durability and handling properties.

As compared to Control Sample B which contains a conventional alkoxysilane/polysulfide coupling agent, Sample C in which the non-silane, non polysulfide coupling agent/carbon black composite, which is the subject of this invention, shows improvement in several of the measured properties, namely reduced DIN abrasion (reduced cm³ rubber loss) with comparable tensile strength and increased E' stiffness. This is considered herein to be significant because reduced DIN abrasion with maintained tensile strength and stiffness will give improved treadwear in tires. This is also considered herein to be significant because maintained stiffness will lease to increased tread durability and handling qualities.

While various embodiments are disclosed herein for practicing the invention, it will be apparent to those skilled in this art that various changes and modifications may be made therein without departing from the spirit or scope of the invention.

What is claimed is:

1. A rubber composition which comprises
   (A) 100 parts by weight of at least one diene-based elastomer,
   (B) about 25 to about 100 phr of particulate reinforcing filler, exclusive of silica treated carbon black, comprised of about zero to about 100 phr of synthetic amorphous precipitated silica aggregates and, correspondingly, from zero to about 75 phr of carbon black, wherein said silica aggregates contain hydroxyl groups on their surface; and
   (C) about 0.5 to about 10 phr of a coupling agent of 1-thioglycerol(3-mercapto-1,2-propanediol) as a composite thereof with carbon black, exclusive of 2,2'-benzothiazyl disulfide, in a weight ratio of said thioglycerol material to said carbon black in a range of from about 1:10 to about 1:1;
   wherein said 1-thioglycerol(3-mercapto-1,2-propanediol)/carbon black composite is mixed with said elastomer(s), according to one or more of the following:
   (1) mixing said 1-thioglycerol(3-mercapto-1,2-propanediol)/carbon black composite with said elastomers and said particulate reinforcing filler;
   (2) mixing said 1-thioglycerol(3-mercapto-1,2-propanediol)/carbon black composite with said elastomer(s) and said particulate reinforcement filler in an internal rubber mixer, wherein said particulate reinforcement filler includes said synthetic precipitated silica aggregates which have been pre-hydrophobated prior to mixing with said elastomers with an alkylsilane of the general formula (II):

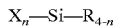
   $$X_n\text{—Si—}R_{4-n} \qquad (II)$$

wherein X is a radical selected from alkoxy radicals having from 1 though 3 carbon atoms, preferably selected from methoxy and ethoxy radicals, and from halogen radicals selected from at least one of chlorine and bromine radicals, preferably a chlorine radical; R is an alkyl radical having from 1 to 18 carbon atoms, preferably from 1 though 4 carbon atoms and more preferably selected from methyl and ethyl groups; and n is an integer of 1 though 3, (3) mixing said 1-thioglycerol(3-mercapto-1,2-propanediol)/carbon black composite with said elastomer(s), an alkylsilane of the said formula (II) and particulate reinforcement in an internal rubber mixer.

2. The rubber composition of claim 1 wherein said compositions contains about 35 to about 90 phr of particulate reinforcing filler comprised of about 10 to about 70 phr of synthetic amorphous precipitated silica aggregates and, correspondingly, from about 10 to about 60 phr of carbon black, wherein said silica aggregates contain hydroxyl groups on their surface.

3. The rubber composition of claim 1 wherein said 1-thioglycerol(3-mercapto-1,2-propanodiol) is reacted with the surface of said precipitated silica aggregates in situ within the elastomer host.

4. The rubber composition of claim 1 wherein said 1-thioglycerol(3-mercapto-1,2-propanodiol) together with a hydrophobating agent of the said general formula (II) are reacted with the surface of said precipitated silica aggregates in situ within the elastomer host.

5. The rubber composition of claim 1 wherein said 1-thioglycerol(3-mercapto-1,2-propanediol)/carbon black composite is mixed with said elastomer(s) with said elastomers and said particulate reinforcing filler in an internal rubber mixer, wherein said particulate reinforcement filler includes said synthetic precipitated silica aggregates which have been pre-hydrophobated prior to mixing with said elastomers with an alkylsilane of said general formula (II).

6. The rubber composition of claim 1 wherein said pre-formed composite is reacted with a hydrophobating agent of the said general formula (II) in situ within the elastomer host.

7. The rubber composition of claim 1 wherein said diene-based elastomer(s) is selected from homopolymers and copolymers of monomers selected from isoprene and 1,3-butadiene and copolymers of at least one diene selected from isoprene and 1,3-butadiene and a vinyl aromatic compound selected from styrene and alphamethyl styrene.

8. An article of manufacture which contains at least one component comprised of the rubber composition of claim 1.

9. A tire which contains at least one component comprised of the rubber composition of claim 1.

10. A tire having a tread comprised of the rubber composition of claim 1.

11. A tire which contains at least one component comprised of the rubber composition of claim 2.

12. A tire which contains at least one component comprised of the rubber composition of claim 3.

13. A tire which contains at least one component comprised of the rubber composition of claim 4.

14. A tire which contains at least one component comprised of the rubber composition of claim 1.

15. A tire which contains at least one component comprised of the rubber composition of claim 1.

16. A tire which contains at least one component comprised of the rubber composition of claim of claim 11.

17. A tire having a tread comprised of the rubber composition of claim 11.

* * * * *